United States Patent [19]

Kinosita

[11] 4,006,637
[45] Feb. 8, 1977

[54] ELECTRO-MECHANICAL DISPLACEMENT TRANSDUCER

[76] Inventor: Yohei Kinosita, Horisaki-cho 1087-1, Omiya, Saitama, Japan, 330

[22] Filed: May 7, 1976

[21] Appl. No.: 684,397

[30] Foreign Application Priority Data

May 16, 1975 Japan ............................ 50-057210
Aug. 29, 1975 Japan ............................ 50-104041

[52] U.S. Cl. .............................. 73/313; 73/290 R
[51] Int. Cl.$^2$ ........................................ G01F 23/26
[58] Field of Search ................ 73/313, 308, 304 R, 73/304 C, 290 R

[56] References Cited

UNITED STATES PATENTS

| | | | |
|---|---|---|---|
| 2,919,579 | 1/1960 | Gronner | 73/304 C |
| 3,296,862 | 1/1967 | Ziniuk | 73/290 R |
| 3,424,002 | 1/1969 | Johnson | 73/290 R |
| 3,695,107 | 10/1972 | Hertz et al. | 73/290 R |
| 3,703,829 | 11/1972 | Dougherty | 73/290 R |
| 3,722,281 | 3/1973 | Marsh | 73/304 R |
| 3,777,566 | 12/1973 | Marinaccio | 73/290 R |
| 3,896,671 | 7/1975 | Marinaccio | 73/304 R |
| 3,922,914 | 12/1975 | Fuchs | 73/290 R |
| 3,948,100 | 4/1976 | Paris et al. | 73/290 R |

Primary Examiner—Richard C. Queisser
Assistant Examiner—Joseph W. Roskos
Attorney, Agent, or Firm—Woodhams, Blanchard and Flynn

[57] ABSTRACT

An electro-mechanical displacement transducer comprises a probe on which shunt capacitance and series inductance are uniformly distributed to form a distributive constant circuit. The probe includes a nonconductive central member coaxially covered by cylindrical inner and outer conductor members insulated and separated from each other, at least one such conductor member being a coil. A pulse source connects to the sending end of the probe and a circuit element having an impedance related to the characteristic impedance of the distributed constant circuit connects the inner and outer conductor members at the receiving end of the probe. In use, the probe is displaceable with respect to a wave reflecting means such that the duration, between the time when a pulse is applied to the sending end of the probe and the arrival of the reflected wave at the sending end of the probe, varies in direct proportion to the relative displacement of the probe and wave reflecting means.

8 Claims, 10 Drawing Figures

ELECTRO-MECHANICAL DISPLACEMENT TRANSDUCER

BACKGROUND OF THE INVENTION

1. Field of the Invention

The present invention relates to electro-mechanical displacement transducers and more particularly to frictionless electro-mechanical displacement transducers for long stroke measurements such as linear variable differential transformers and electro-capacitance transducers.

2. Description of the Prior Art

Two general types of transducers for detecting a mechanical displacement or stroke in the form of electrical signals are well known. A first known type of electro-mechanical transducer is a linear variable differential transformer. The linear variable differential transformers have excellent accuracy and resolution. However, their measurable strokes or displacements are restricted to a certain amount due to their principle of operation.

A second known type of electro-mechanical transducer is an electro-capacitance transducer. In these transducers measurable strokes beyond 2000 mm are now available, but their resolution of detecting mechanical displacement or stroke is only 0.25% or so. Both types of electro-mechanical displacement transducers mentioned above work usually successfully, but in a long stroke or displacement measurement we have not been satisfied with their performances from the viewpoint of accuracy and resolution.

An object of the invention is to provide an electro-mechanical displacement transducer apparatus with a new principle of operation, and having a probe which is easier to fabricate and more versatile than known previous devices.

A further object is to provide such an apparatus in which mechanical displacement is detected in the form of electric propagation delay of a voltage waveform on the probe, which delay may be time-coded by a clock oscillator.

A further object is to provide such an apparatus which eliminates the above-mentioned problems of the known types of electro-mechanical displacement transducers.

SUMMARY OF THE INVENTION

The electro-mechanical displacement transducers of the present invention overcome the disadvantages inherent in both of the above-discussed types of prior art transducers. The probe of the transducer of the present invention is a kind of distributed constant circuit, like a transmission line, on which the shunt capacitance and series inductance are uniformly distributed. The propagation velocity of a voltage waveform per unit length of the probe of the present invention is to be determined by the shunt capacitance and series inductance per unit length of the probe of the present invention. In the probe of the present invention, the shunt capacitance or series inductance distributed throughout the probe changes partially according to the mechanical displacement. Therefore the propagation velocity of a voltage waveform travelling along the probe of the present invention is partially changed and a reflection of the voltage waveform is to be introduced. The duration between the time when a pulse is applied to the sending end of the probe and the arrival of the reflected wave at the sending end of the probe of the present invention is measured by the prior art time-coding method. The said duration is directly proportional to the mechanical displacement.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION

For ease of understanding of the various aspects of the present invention, the transmission line theory to which the present invention relates is presented before discussing the detail of the present invention.

Travelling Wave on a Transmission Line

Figure 1:
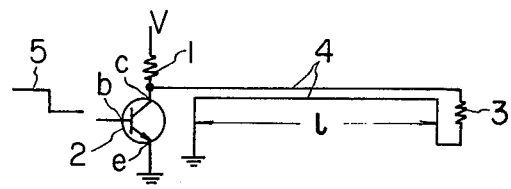
FIG. 1 is a typical transmission line circuit to which the present invention relates.

A typical transmission line circuit is shown in FIG. 1. The circuit of FIG. 1 includes a transistor 2 driving a pulse to the sending end of a transmission line 4, a fixed resistance 1, the transmission line 4 of length l and a fixed resistance 3. The sending end of the transmission line 4 is connected to a constant voltage source V through the fixed resistance 1 and the receiving end of the transmission line 4 is terminated in the fixed resistance 3. The important characteristics of the transmission line 4 are the signal propagation velocity v and the characteristic impedance Z. The shunt capacitance and series inductance are distributed on the transmission line 4 whose characteristic impedance Z and signal propagation velocity $v$ are given by EQ. 1 and EQ. 2 immediately below.

$$Z = \sqrt{L/C} \ldots \text{ohm} \qquad \text{EQ. 1}$$

$$v = 1/\sqrt{LC} \ldots \text{unit length/sec.} \qquad \text{EQ. 2}$$

Where

C; Capacitance F/unit length of the transmission line 4

L; Inductance H/unit length of the transmission line 4

Figure 2:
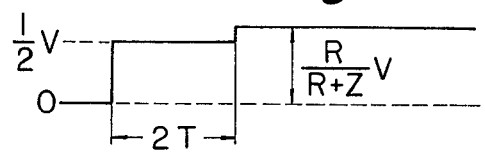
FIG. 2 is a view of the voltage waveform at the sending end of the transmission line 4 of FIG. 1.

When a negative going pulse 5 is applied to the base $b$ of the transistor 2 of FIG. 1, then the transistor 2 cuts off and the voltage at the sending end of the transmission line 4 rises up. At this instant a step voltage waveform V/2 (FIG. 2) appears at the sending end of the transmission line 4 because the fixed resistance 1 is designed to be equal to the characteristic impedance Z of the transmission line 4. This discontinuity, i.e. the step voltage waveform V/2, travels $v$ unit length per sec. to the receiving end of the transmission line 4 of FIG. 1. At the receiving end of the transmission line 4 a second discontinuity then will start toward the sending end of the transmission line since the fixed resistance 3 (R>Z) is designed not to be equal to the characteristic impedance Z of the transmission line 4. When this second edge of the wave, reflected at the receiving end of the transmission line 4, reaches the sending end of the transmission line 4, it will add some voltage to the voltage V/2 established previously. The resultant waveform at the sending end of the transmission line 4 will be a pulse as indicated in FIG. 2. The advantage of producing a pulse in the manner described above is that the duration of 2T of FIG. 2 depends only on passive elements and thus may have a stability not shared by a pulse generator (not shown) which depends upon active elements. As the duration 2T of FIG. 2 can be measured by means of prior art time-coding devices, the length l of the transmission line 4 of FIG. 1 can be obtained in the form of EQ. 3 immediately below.

$$l = T \cdot v = T/\sqrt{LC} \qquad \text{EQ. 3}$$

In view of this, if the shunt capacitance and series inductance per unit length of the transmission line 4 of FIG. 1 could become larger, more precise measurement of the duration 2T of FIG. 2 for the same length of the transmission line 4 would be possible.

Travelling Wave on the First Type Probe of the Present Invention

Figure 3:
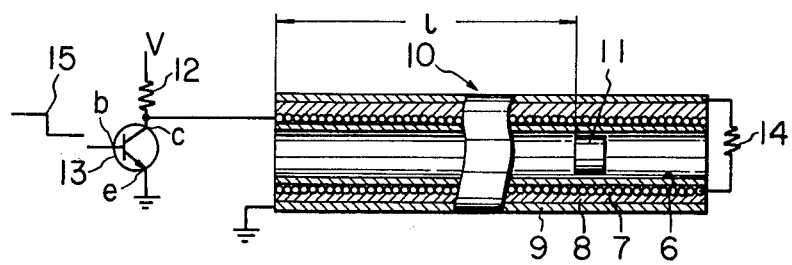
FIG. 3 is a cross-sectional view of a first type probe 10 of the present invention and a pulse driving circuit is also shown.

FIG. 3 shows a cross-sectional view of a first type probe 10 of the present invention and further shows a pulse driving circuit comprising a transistor 13 and a fixed resistance 12. In order to increase the series inductance L distributed on the first type probe 10, one of the straight conductors of the transmission line 4 of FIG. 1 is replaced with a continuous coil 7 of insulated wire in the form of a helix as indicated in FIG. 3. As an outer conductor, the other of the straight conductors of the transmission line 4 of FIG. 1 is replaced with the cylindrical conductor 9 surrounding the above mentioned inner coil 7 of FIG. 3. The cylindrical conductor 9 duly includes a slot (not shown) throughout the full length of the probe 10 to prevent the circulation of eddy currents in paths concentric to the axis of the probe 10. The inner coil 7 of the first type probe 10 is helically wound on a nonmetallic (insulative) hollow pipe 6 and a thin insulating layer 8 is uniformly located between the inner coil 7 and the cylindrical outer conductor 9 throughout the probe 10.

As in the circuit of FIG. 1, the sending end of the inner coil 7 of the probe 10 is connected to the collector $c$ of the transistor 13 and is fed the constant voltage V through the fixed resistance 12 whose impedance is made to be equal to the characteristic impedance Z of the probe 10. The receiving end of the probe 10 is terminated in the fixed resistance 14 whose impedance is also designed to be equal to the characteristic impedance Z of the probe 10. As shown in FIG. 3, a ferromagnetic inner core 11 is so inserted in the center nonmetallic hollow pipe 6 in a movable manner that the mechanical displacement of the inner core 11 may be detected by means of the time-coding method described below.

Figure 4:
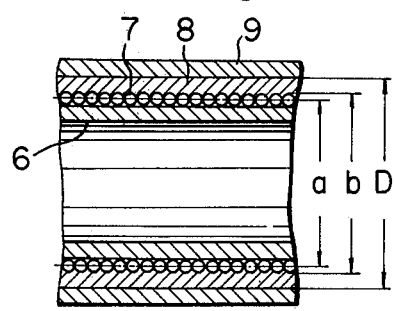
FIG. 4 is an enlarged cross-sectional view of the probe 10 of FIG. 3.

Since the inner coil 7 is wound in a tight helix, the series inductance L per unit length of the probe 10 then equals that of a solenoid of diameter $a$ (see FIG. 4 which is an enlarged cross-sectional view of the probe 10 of FIG. 3), with $n$ turns per unit length, and is given by EQ. 4 immediately below.

$$L = \mu_r \eta^2 \pi a^2 \times 10^{-7} \text{ H/unit length of the probe 10} \qquad \text{EQ. 4}$$

where $\mu_r$ is the relative permeability of the air surrounded by the hollow pipe 6. It is apparent that the relative permeability $\mu_c$ of the inner core 11 is far larger than $\mu_r$; therefore the partial inductance of the probe 10 at the inner core 11 becomes larger than that of the rest of the probe 10. The shunt capacitance C per unit length of the probe 10 is that of coaxial cylinders with a material 8 of relative dielectric constant $\epsilon_r$ between the diameter D and $d$ as shown in FIG. 4, or $$C = \frac{2.4 \times 10^{-11} \times \epsilon_r}{\log_{10}(D/d)} \quad \text{F/unit length of the probe 10} \qquad \text{EQ. 5}$$

It should be noticed that not only the series inductance L but also the shunt capacitance C of the first type probe 10 of the present invention are uniformly distributed.

When a negative going step signal 15 is applied to the base $b$ of the transistor 13 of FIG. 3, then the voltage at the sending end of the probe 10 rises up to V/2 from 0 because the fixed resistance 12 is designed to be equal to the characteristic impedance Z of the probe 10. This voltage discontinuity travels at a speed $v$ units length per sec. (being calculated by EQS 2, 4 and 5) toward the receiving end of the probe 10. Before the wave reaches the receiving end of the probe 10, it comes to the place where the inner core 11 is situated, the partial series inductance of the probe 10 at this place being larger by $\mu_c/\mu_r$ times than along the rest of the probe 10. The core produces a second discontinuity, wherein a part of the wave is reflected and starts to the left. The rest of the wave keeps travelling to the receiving end of the probe 10 which has a matched termination such that no further waveform discontinuity is introduced. The resultant waveform at the sending end of the probe 10 will be a pulse as indicated in FIG. 5.

Figure 5:
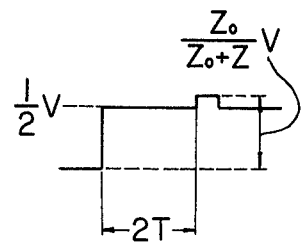
FIG. 5 is a view of the voltage waveform at the sending end of the probe 10 of FIG. 3 after a negative going pulse 15 has been applied to the base $b$ of the transistor 13 of FIG. 3.

In FIG. 5, Zo denotes the effective characteristic impedance of the portion of the probe 10 where the inner core 11 is located. The duration 2T of FIG. 5, which varies according to the axial movement of the inner core 11 in the probe 10 can be easily detected and measured by the mentioned known time-coding devices. In the above-mentioned manner, the mechanical displacement of the inner core 11 of the probe 10 of the present invention can be detected and transferred to the electric signal.

A Typical Application of the First Type Probe of the Present Invention

Figure 6:
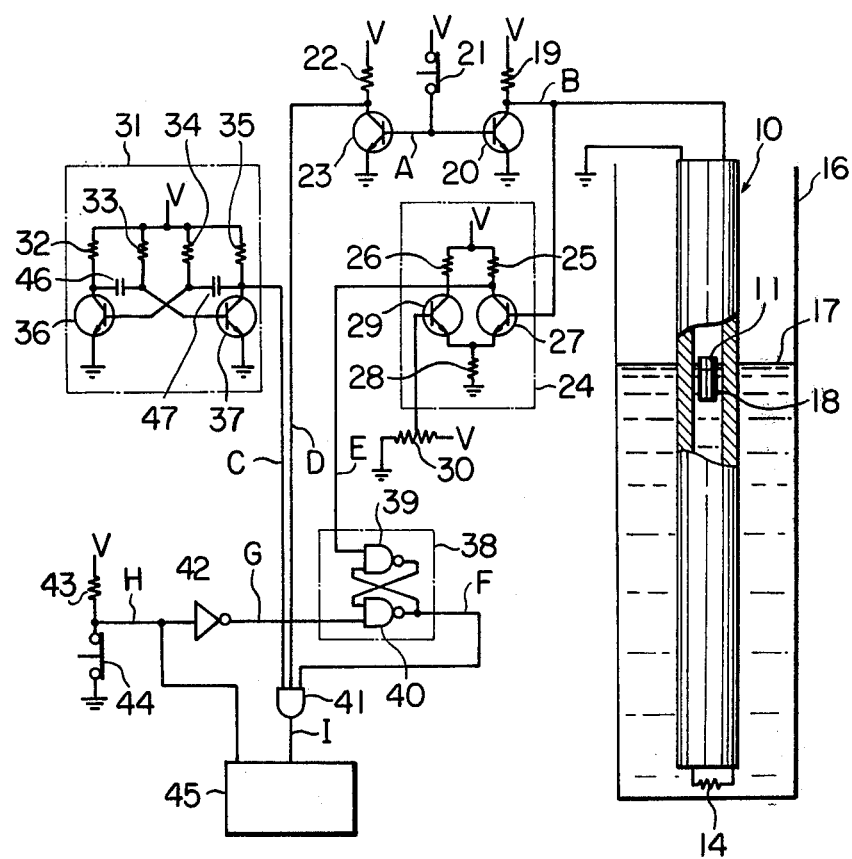
FIG. 6 shows a preferred arrangement of the first (FIG. 3) type probe 10 of the present invention vertically arranged in the tank 16 filled with liquid 17 and connected to a typical instrumentation circuit.

FIG. 6 shows a typical installation of the first type probe 10 of FIG. 3. FIG. 6 shows the probe 10 vertically arranged in a tank 16 filled with liquid 17 and a circuit for measurement of the duration 2T of FIG. 5. For ease of understanding of the operation of the instrumentation circuit of FIG. 6, the voltage waveforms at the various points in the wiring circuit of FIG. 6 (denoted by A through I) are provided in FIG. 7.

As seen in FIG. 6, inner core 11 of the probe 10 is attached to a float 18 and is inserted freeely in the nonmetallic hollow pipe 6 which is filled with the liquid 17, so that the inner core 11 with the float 18 moves vertically in the hollow pipe 6 according to the level change of the liquid 17 in the tank 16. Consequently the duration 2T of FIG. 5 changes according to the level of the liquid 17 in the tank 16.

The instrumentation circuit of FIG. 6 includes several units. One is an emitter coupled current switch 24 having a pair of transistors 27, 29, a pair of fixed resistances 25, 26 and a common fixed resistance 28. An astable multivibrator 31 has a pair of transistors 36, 37, fixed resistances 32 through 35 and a pair of the condensers 46, 47. A flip-flop 38 is made up of a pair of the NAND elements 39, 40. Also provided are an AND gate 41 with three inputs, an inverter 42 and a resettable counter 45. Such components are all of known type.

Figure 7:
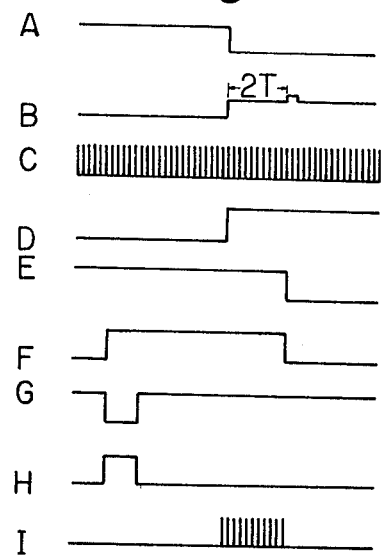
FIG. 7 is a view of the voltage waveform at various positions in the instrumentation circuit of FIG. 6.

The multivibrator 31 produces the clock pulses C of FIG. 7, the frequency of which is determined by the condensers 46, 47 and the fixed resistances 33, 34 in the multivibrator 31. Such clock pulses are applied through the AND gate 41 to the counter 45. The current switch 24 detects the larger voltage than V/2 after the duration 2T of FIG. 5 at the sending end of the probe 10 and generates the low level signal shown at E in FIG. 7. The trigger level of the current switch 24 is adjusted by a variable resistance 30.

The instrumentation circuit comprising the above-mentioned circuits and elements is not essential to the present invention in its broadest aspects. However, the brief description for the sequence of the operation of the instrumentation circuit of FIG. 6 is presented as follows. At first a reset switch 44 is operated drawing current through a resistor 43 from a suitable voltage source and producing a high level signal H (FIG. 7). The signal H is applied to the counter 45 for resetting same and to the flip-flop 38 for setting same through the inverter 42 as shown at F in FIG. 7.

After finishing the resetting of the counter 45 and the setting of the flip-flop 38 as above-mentioned, a start switch 21 may be operated. Such disconnects operating potential source V from the bases of a pair of transistors 20 and 23 such that the transistors 20, 23 are turned off. The transistors 20 and 23 when conductive short to ground current paths from constant potential source V through a resistor 19 to probe 10 and through a resistor 22 to AND gate 41.

With transistors 20 and 23 turned off, the constant voltage is applied not only to the sending end of the probe 10 through the fixed resistance 19 as indicated at B in FIG. 7 but also to the one of the inputs of the AND gate 41 through the fixed resistance 22 as indicated at D in FIG. 7. Now the AND gate 41 is fully opened and the counter 45 begins counting the clock pulses generated by the multivibrator 31.

After the duration 2T of FIG. 5, the current switch 24 works and applies a low level signal E (FIG. 7) to the flip-flop 38 which resets the flip-flop 38 as shown at F in FIG. 7 and the AND gate 41 closes (blocks).

In the above-described manner, the displacement of the inner core 11 attached to the float 18, changing according to the level of the liquid 17 in the tank 16, can easily be related to the number of clock pulses of the multivibrator 31.

The Second Type Probe of the Present Invention

Figure 8:
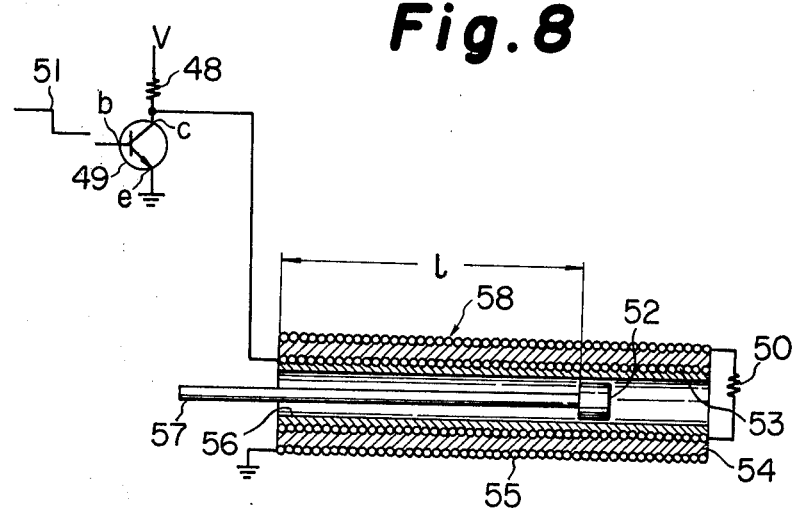
FIG. 8 is a cross-sectional view of a second type probe 58 of the present invention connected to a pulse driving circuit.

FIG. 8 shows a cross-sectional view of a second type probe 58 of the present invention and a pulse driving circuit comprising a transistor 49 and a fixed resistance 48. The probe 58 has a displaceable inner core 52 corresponding to core 11 of FIG. 3. To increase the series inductance L distributed on the second type probe 58 to beyond that of the first type probe 10 of FIG. 3 and to obtain the more accurate measurement of the displacement of the inner core 52 for the same length, the cylindrical conductor 9 of FIG. 3 is replaced with a continuous outer coil 55 of insulated wire in the form of a helix. The winding direction of the outer coil 55 is opposite to that of inner coil 53. The inner coil 53, just like the inner coil 7 of FIG. 3, is helically wound on a nonmetallic hollow pipe 56 and thin insulating material 54 is uniformly located between the inner coil 53 and the outer coil 55 throughout the probe 58. The sending end of the inner coil 53 of the probe 58 is connected to the collector C of the transistor 49 and is fed the constant voltage V through the fixed resistance 48 whose impedance is made to be equal to the characteristic impedance Z of the probe 58.

The receiving end of the probe 58 is terminated in a fixed resistance 50 whose impedance is also designed to be equal to the characteristic impedance Z of the probe 58. As shown in FIG. 8, the ferromagnetic inner core 52 is attached to a rod 57 and is inserted in the center nonmetallic hollow pipe 56 in a movable manner, such that mechanical displacement of the inner core 52 attached to the rod 57 may be detected by the time-coding method described previously. The resultant waveform at the sending end of the probe 58 of FIG. 8 after introducing a negative going step pulse 51 to the base *b* of the transistor 49 will be a pulse just like as indicated in FIG. 5.

Travelling Wave on the Third Type Probe of the Present Invention

Figure 9:
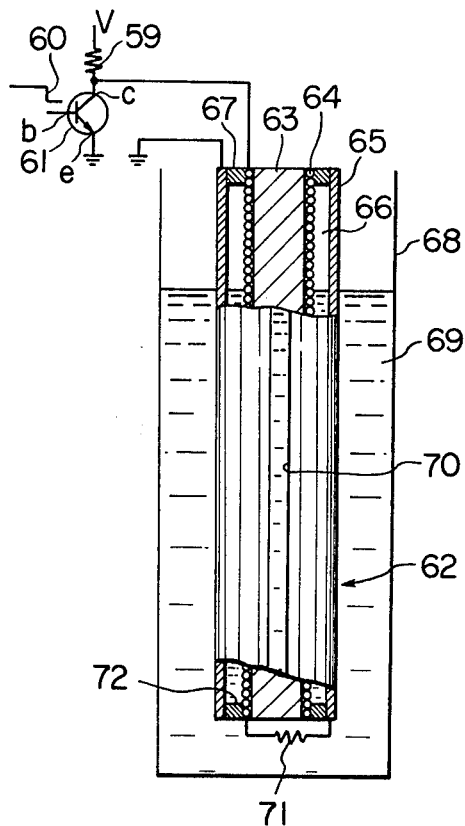
FIG. 9 is a cross-sectional view of a third type probe 62 of the present invention vertically arranged in the tank 68 filled with the liquid 69 and connected to a pulse driving circuit.

Attention is now directed to a third type probe 62 shown in FIG. 9 vertically arranged in a tank 68 with liquid 69. The third type probe 62 may successfully be used as a liquid level indicator. An inner coil 64 of the probe 62 is wound in a tight helix on a nonmetallic column 63 and an outer conductor 65 is a cylinder located coaxially around the inner coil 64 and is held coaxially of the inner coil 64 by nonmetallic spacers 67, 72. The liquid 69 in the tank 68 flows into the annular space 66 between the inner coil 64 and the outer conductor 65 through a slit 70 on the outer conductor 65.

The sending end of the probe 62 is connected to the collector C of a transistor 61 and a constant voltage V is supplied through a fixed resistance 59, the impedance of which is designed to be equal to the characteristic impedance Z of the probe 62 when the probe 62 is above the surface of the liquid 69 in the tank 68. The receiving end of the probe 62 is terminated in a fixed resistance 71, the impedance of which is made to be equal to the characteristic impedance Zo of the probe 62 when the latter is below the surface of the liquid 69 in the tank 68.

The liquid levels in the annular space 66 and in the tank 68 rise together as the tank is filled with the liquid 69. Thus, the shunt capacitance between the inner coil 64 and the outer conductor 65 below the surface of the liquid 69 becomes larger than that of the probe 62 above the surface of the liquid 69.

Figure 10:
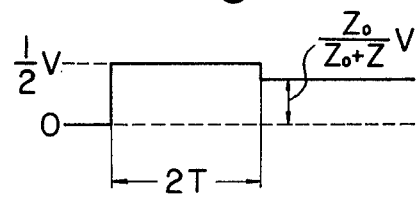
FIG. 10 is a view of the voltage waveform at the sending end of the probe 62 of FIG. 9 after a negative going pulse 60 has been applied to the base $b$ of the transistor 61 of FIG. 9.

Consequently the characteristic impedance Z of the probe 62 above the surface of the liquid 69 becomes larger than the characteristic impedance Zo of the probe 62 below the surface of the liquid 69 by reference to EQ. 1. If a negative going step pulse 60 is applied to the base $b$ of the transistor 61, the voltage at the sending end of the probe 62 rises up to V/2 from 0. As described previously, this waveform discontinuity travels toward the bottom of the probe 62. Before the waveform discontinuity reaches the receiving end of the probe 62, it reaches the impedance discontinuity at the surface of the liquid 69, where the characteristic impedance of the probe 62 abruptly changes from Z to Zo as above-mentioned. At the surface of the liquid 69, a part of the wave is reflected and comes back to the sending end, and the other of the wave keeps travelling to the receiving end of the probe 62 without introducing any other reflection. The resultant waveform at the sending end of the probe 62 will be a pulse as shown in FIG. 10. It is now apparent that the duration of 2T of FIG. 10 changes according to the movement of the surface of the liquid 69. In this way, the level of the liquid 69 in the tank 68 is detected and converted to an electric signal.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. An electro-mechanical displacement transducer comprising a probe on which shunt capacitance and series inductance are uniformly distributed lengthwise to form a distributive constant circuit, said probe including elongate substantially coaxial hollow conductor members with annular insulating means interposed therebetween, at least one of said conductor members being a tightly wound coil extending lengthwise of said probe, means having an impedance equivalent to the characteristic impedance of the distributive constant circuit and connecting said inner and outer conductor members at the receiving end of the probe, said conductor members having sending ends, remote from said receiving end, connectible to an electrical wave generating means, said probe including a hollow space extending longitudinally thereof for receiving relatively movable means introducing an impedance variation shiftable therein lengthwise of said probe, whereby the position of such impedance variation means movable inside said probe is detectable by the span of time during which an electromagnetic wave emitted from the sending end of the distributive constant circuit travels to and back from the location of said impedance variation means in said probe.

2. An electro-mechanical displacement transducer as claimed in claim 1 in which said probe includes a non-conductive hollow pipe disposed within said conductor members, said one conductor member being a coil tightly wound around said nonconductive hollow pipe, the other conductor member being a cylindrical outer conductor insulatingly and coaxially disposed close to said coil, said coil and outer conductor being connected at the receiving ends by said impedance means, said impedance variation means comprising a ferromagnetic inner core slidably fitted in said hollow pipe, whereby the position of said inner core moving inside said hollow pipe is detected by said span of time during which said electromagnetic wave emitted from the sending end of the distributive constant circuit travels within said coil to and back from the position corresponding to said inner core.

3. An electro-mechanical displacement transducer as claimed in claim 1 in which said probe includes a nonconductive hollow pipe, said conductor members comprising an inner coil wound tightly on said hollow pipe and an outer coil tightly wound coaxially with and oppositely with respect to said inner coil and being insulated therefrom, said inner and outer coils being connected to each other at said receiving end through said impedance means, said impedance variation means comprising a ferromagnetic inner core slidably fitted in said hollow pipe, whereby the position of said inner core moving inside said hollow pipe is detected by means of the span of time during which an electromagnetic wave applied to the sending end of said distributive constant circuit travels within either the inner or the outer coil to and back from the position of said inner core.

4. An electro-mechanical displacement transducer as claimed in claim 1 in which said probe includes a nonconductive hollow pipe disposed inside said conductor members, said impedance variation means comprising a ferromagnetic inner core slidably fitted in said hollow pipe, and including a float connected to said inner core and arranged with respect to said pipe for keeping such inner core afloat above a liquid entering such hollow pipe, whereby said span of time provides an indication of liquid level along the length of such probe.

5. An electro-mechanical displacement transducer as claimed in claim 1 in which said probe comprises a nonconductive solid cylinder at the center thereof, the inner of said conductor members being a coil tightly wound on said nonconductive solid cylinder, the remaining said conductor member being a cylindrical outer conductor disposed coaxially around and radially spaced from said coil, said cylindrical outer conductor having a longitudinal slit for entry of a liquid therethrough into the space between said conductor members, said impedance means being connected to the receiving ends of said coil and outer conductor, whereby the distance between sending end of the distributed constant circuit and the surface of a liquid entering the outer conductor through its slit is detected by means of the span of time during which an electromagnetic wave applied to the sending end travels within the coil to and back from the position corresponding to the liquid surface.

6. An electro-mechanical displacement transducer as claimed in claim 1 including a constant voltage source and a circuit having an impedance equivalent to the characteristic impedance of the distributed constant circuit normally connecting said constant voltage source across the sending ends of said conductor members, said circuit including electronic valve means actuable to short circuit the sending ends of said conductor members so as to apply a voltage step constituting said electromagnetic wave to the distributive constant circuit.

7. An electro-mechanical displacement transducer as claimed in claim 6 including an instrumentation circuit for measuring the relative displacement of said probe and said impedance varying means, said instrumentation circuit including a source of clock pulses and a counter and an AND gate interconnecting same, electronic switch means actuable simultaneously with application of said voltage step to said probe sending end for turning on said AND gate and thereby causing said counter to accumulate clock pulses, current switch means responsive to reflection of said voltage step from the location along said probe of said impedance variation means for producing an output, flip-flop means controlling a further input of said AND gate in response to said current switch means output for turning off said AND gate, such that the number of pulses accumulated by said counter corresponds to the separation of said impedance variation means from said sending end of said probe and hence is a measure of relative displacement as between said impedance variation means and said probe.

8. An electro-mechanical displacement transducer as claimed in claim 7 in which said instrumentation circuit further includes reset switch means operable to reset said counter and set said flip-flop means for a further cycle of operation, and including manual switch means in series with a voltage source and operable for simultaneously applying said voltage step to said probe sending end and to enable said AND gate in cooperation with the set flip-flop means.

* * * * *